Patented Nov. 24, 1936

2,061,543

UNITED STATES PATENT OFFICE 2,061,543

METHOD OF PREPARING PLASTIC MATERIALS DERIVED FROM UREA AND FORMALDEHYDE

René Armenault, Paris, France, assignor of one-half to Fabriques de Produits de Chimie Organique de Laire, Issy, France, a company of France No Drawing. Application June 24, 1933, Serial No. 677,532. In France June 30, 1932

6 Claims. (Cl. 260—3)

It has been disclosed by the U. S. Patent No. 2,004,996 dated June 18, 1935, that hydrogen sulphide and the alkaline sulphides fix the free formaldehyde that may exist in the course of urea and formaldehyde condensation reactions, thus producing sulphuretted compounds capable of modifying the properties of the final product. In the preparation of moldable materials having a very good resistance to water, the introduction of these sulphuretted compounds is very advantageous.

Ammonium sulphide has already been utilized as a condensation agent in the reaction of urea and formaldehyde, but the action of this sulphide, when in the presence of formaldehyde, is very particular and very different from the action of hydrogen sulphide. In the case of ammonium sulphide, cyclic amino sulphuretted derivatives are produced. These derivatives have been studied by Delépine.

On the contrary hydrogen sulphide produces thioaldehyde or polymerization products of the latter, all of which products do not contain nitrogen. Now, if, as above stated, thioaldehydes are of interest when they are present in the urea-formaldehyde condensation products, the same is not true of their polymerization products; these polymers, for instance trithioaldehydes, are solid compounds, practically insoluble in ordinary solvents and their action on urea-formaldehyde compounds is relatively weak, or even inexistent, under the ordinary conditions of formation of said compounds.

In order to avoid the production of these polymerization products, it suffices to cause these thioaldehydes to combine in statu nascendi with bodies present in the reaction mass.

Now, the usual method of preparing thioformaldehyde consists in causing hydrogen sulphide to act on formaldehyde in a medium that is definitely acid, generally in a hydrochloric medium. But this method cannot be applied in the presence of urea-formaldehyde condensation products, the instability of these products in such a strongly acid medium being well known. On the oher hand, alkaline or alkali-earth sulphides, such as sodium sulphide, barium sulphide, etc. also transform rapidly formaldehyde into polymerized sulphuretted products, in an alkaline medium. Furthermore, to this secondary reaction there is added the usual polymerizing action of the base, through which formaldehyde is transformed into carbohydrates.

It is also possible to obtain sulphuretted compounds of formaldehyde by means of zinc sulphide but only in an acid medium. In this case also the nature of this medium makes it extremely difficult to apply this reaction in the presence of methylolureas.

The object of the present invention is to provide a simple and efficient method of preparing plastic materials consisting mainly of urea and formaldehyde and containing any desired amount of thioaldehydes.

The method according to the present invention consists essentially in producing hydrogen sulphide in the nascent state in the very mass of the urea-formaldehyde solutions, either before, or after, the formation of methylolureas, by double decomposition, controlling in the known manner the pH of the reaction medium so that it is maintained in the vicinity of its optimum value, that is to say, for practical purposes, very close to neutrality.

Alkaline and alkali-earth sulphides other than ammonium sulphide permit to obtain easily these conditions of reaction, since it suffices to release hydrogen sulphide by adding an acid whereas it is always possible to maintain a suitable concentration of H ions that is practically uniform merely by suitably regulating the rate of introduction of the two solutions of sulphide and of acid. By operating in this manner, in the presence of urea-formaldehyde liquors, either in the condensated form or not, there is no evolution of hydrogen sulphide, this body being fixed in the nascent state. On the contrary the characteristic odor of thioaldehydes can be clearly perceived.

The alkaline sulphides, such as sodium sulphide, have the disadvantage of introducing into the condensation product a salt the solubility of which varies according to the nature of the acid that has been utilized for disengaging hydrogen sulphide. The use of barium sulphide makes it possible to avoid the persistency of any barium salt in the final product. This is due to the fact that hydrogen sulphide can be, in this case, disengaged by the addition of sulphuric acid, which eliminates the barium in the form of an insoluble sulphate.

However this reagent necessitates a permanent control of the acidity of the medium, if it is desired to avoid the very active polymerizing action of said acid.

The following method, which is based on the use of carbon dioxide, which eliminates in a regular manner the barium produced in the form of insoluble barium carbonate, gives, with the minimum of control, the most constant results. In the urea-formaldehyde solution, or in the syrup to be treated, a regular current of carbon dioxide is caused to pass, on the one hand, and the solution of barium sulphide is slowly added, on the other hand. The hydrogen sulphide that is liberated by the action of carbon dioxide is immediately fixed in the form of sulphuretted derivatives and the solution is substantially neutral when the reaction is completed. It then suffices to separate by filtration the barium carbonate that has been produced.

The properties of urea-formaldehyde condensation products in which sulphur has been added in variable proportions through the intermediary of hydrogen sulphide and thioaldehydes in the nascent state are analogous to the properties of thiourea-formaldehyde condensation products.

The molecular proportion of sulphur that is introduced with respect to the initial molecule of urea may vary within very wide limits according to the results that it is desired to obtain. But it has been noted that the presence of a relatively small amount of sulphur suffices for greatly modifying the properties of the urea-formaldehyde condensation products that are thus treated.

Instead of performing the reaction in an aqueous medium, it is also possible to perform it in an anhydrous medium, which makes it possible to obtain, besides mouldable materials, lacs, varnishes, enamels, films, etc. All these products may be given, as it will be hereinafter explained, by using appropriate sulphides, luminescent properties. Furthermore, contrary to analogous products that are already known, they have remarkable stabilities concerning adhesion to glass or to metals, and a very good resistance to atmospheric agents. Sulphides that are insoluble or little soluble, or that are slowly decomposed by water, such as metallic (zinc) sulphides and some alkali-earth sulphides (calcium, barium, strontium sulphides) are particularly well adapted to this special method.

In the mixtures of these sulphides with the polymers of formaldehyde or with urea-formaldehyde or thiourea-formaldehyde condensation products that are practically dry that is to say the state of hydration of which corresponds generally to a maximum percentage of water varying between 4 and 8 percent, the slow formation of these thio-derivatives can already be observed in the cold state, as if, among the bodies that are formed, there are some that facilitate the evolution of hydrogen sulphide. The reaction is accelerated by adding an acid compound capable of displacing hydrogen sulphide from the sulphide. It is also possible to activate the condensation by raising the temperature.

The method according to my invention can also be applied with urea-formaldehyde or thiourea-formaldehyde condensation products containing various filling materials, either organic or mineral, provided that these materials have no action tending to fix the hydrogen sulphide that is evolved or to neutralize the acid compound that is added.

It is not absolutely necessary to perform this reaction in the presence of products resulting from a preliminary condensation of urea or thiourea with formaldehyde. The formation of these thio-derivatives is also observed in a mixture containing, besides urea or its derivatives, a polymer of formaldehyde, such as trioxymethylene. The reaction, which is already perceptible in the cold state, can be accelerated in the manner above indicated.

It is also possible to operate in the presence of the ordinary solvents of methylol derivatives, such as alcohols, or in the presence of mixture of solvents capable of modifying the properties of the lacs or varnishes that are obtained. In this case the sulphide that is not decomposed and the residuum resulting from its partial decomposition can be eliminated by filtration or they may, in some cases, be utilized as filling materials.

The phenomena of phosphorescence or luminescence disclosed by some kinds of sulphides or polysulphides either of the alkali-earth or of another group have been known for a long time. They are especially noticeable in the case of some mixtures of complex and variable composition, containing a certain amount of metallic or alkali-earth sulphides such as zinc sulphide, strontium sulphide, calcium sulphide, etc. My invention includes the utilization of sulphides of this class, which may have been, eventually, activated by incorporating therewith a radioactive salt or mixture, or by subjecting them to the influence of these bodies. These sulphides, according to my experiments, keep their luminescent properties as long as they have not been wholly decomposed. By judiciously dosing the amount of sulphide (either activated or not), and also that of the acid compound, that are added, it is possible to obtain thio-aldehydes, or urea-formaldehyde thio-derivatives, while maintaining a certain luminescence of the products thus prepared and which are intended to be used as mouldable materials, lacs, varnishes, films, etc.

The following examples, which are not limitative, are intended to disclose some methods of obtaining products according to the present invention.

*Example 1*

In a cold solution of 300 parts of urea in 1000 parts of 30% formaldehyde I add, slowly and gradually, so as to maintain the solution nearly neutral, on the one hand an aqueous saturated solution containing 120 parts of sodium sulphide, and on the other hand the equivalent amount of an acid capable of displacing hydrogen sulphide, formic acid for instance.

The pH of the solution is maintained at a given value, by means, for instance of zinc carbonate, after slightly acidifying if that is necessary. The filtered liquor, maintained in the cold state for a period of time ranging between 36 and 48 hours, can be used for preparing plastic masses which may or not contain filling materials.

*Example 2*

I take the aqueous solution of a dimethylol prepared in the cold state according to the explanations given in my U. S. Patent No. 2,004,970 dated June 18, 1935, and treat this solution in the same manner as above described in Example 1. The desired compound will be obtained under the same conditions. The liquor that is obtained can be utilized as such. It is also possible to heat it for a variable period of time, thus producing a resin that is less and less soluble in water. The syrup thus heated can be utilized for preparing plastic materials, containing if desired filling materials and which withstand very well the action of water.

Example 3

The proportions and the method disclosed in Example 1 may also be applied to the treatment of a syrup resulting from the condensation, in the hot state, of for instance 300 parts of urea in the presence of formaldehyde and zinc carbonate. It has been found that, after the treatment, the solubility of the syrup in water has considerably increased and that it suffices to heat, for about one hour, for obtaining a syrup giving an abundant resinous precipitate, even in the presence of hot water.

The method utilized in Examples 1, 2 and 3 leaves, in the condensation products thus treated, a dissolved salt, viz. sodium formate. This salt may have a disturbing action in some cases and the following examples describe two methods permitting to avoid this slight drawback.

Example 4

In a cold solution of 300 parts of urea in 1000 parts of 30% formaldehyde, is treated as explained in Example 1, but sodium sulphide is replaced by an aqueous solution of barium sulphide obtained by exhausting, in the hot state, 420 parts of barium sulphide of the commercial grade of 60-65% strength by means of 1000 parts of water. Diluted sulphuric acid is utilized for displacing hydrogen sulphide. The reaction takes place normally as in the case of Example 1 and a slightly alkaline state is maintained in order to avoid the polymerizing action of free sulphuric acid, which action is very strong. Once the reaction is completed, barium sulphate is separated by filtration.

The same reaction can also be applied to the treatment of dimethylolurea solutions prepared in the cold state as well as to the treatment of urea-formaldehyde condensation products obtained in the hot state.

Example 5

In the preceding example, the very active polymerizing action of the acid serving to liberate hydrogen sulphide necessitates a permanent control in order to avoid the presence of said acid in the free state. The following method permits to avoid this drawback and gives very uniform results.

In the cold urea-formaldehyde solution, or in the dimethylolureas solution, or again in the syrup resulting from a preliminary condensation in the hot state, I cause a uniform current of carbon dioxide to bubble. The barium sulphide solution is then slowly added, carbon dioxide being caused to bubble until the whole of the hydrogen sulphide has been displaced. A mere control by means of phenolphthalein permits to ascertain that the solution is then practically neutral. Barium carbonate is separated by filtration and the solutions are utilized either such as they are, or after heating, for preparing plastic masses, optionally containing filling materials. The proportions of the sulphuretted agent and the ratio of urea and formaldehyde may, according to the properties to be obtained, be increased or reduced within limits indicated in the literature treating this question.

By utilizing the process above described, no evolution of hydrogen sulphide is observed at any time, since said hydrogen sulphide is immediately fixed in the form of sulphuretted compounds the presence of which greatly modifies the properties of urea-formaldehyde condensation products. The new substances thus obtained have a resinous aspect and are insoluble in water.

Example 6

I start from 80-90 parts of a mouldable powder prepared according to known methods and containing, for instance, 60 parts of urea-formaldehyde, or thiourea-formaldehyde resin and 40 parts of a cellulosic filling material, catalyzed by from 0.5 to 2 parts of an acid compound. I incorporate therewith from 10 to 20 parts of a powder of complex composition, prepared in the dry state, and containing from 45 to 50% of a metallic sulphide such as zinc sulphide, or of an alkali-earth sulphide such as calcium sulphide, strontium sulphide, etc.

The mixture, left at ordinary temperature, soon presents the characteristic odour of formaldehyde thio-derivatives. If pressed in a mould at a temperature averaging 140° C., it produces excellent mouldings. If the sulphides that have been utilized have been suitably prepared for having phosphorescent properties, the moulded pieces thus obtained are also, after having been exposed to light, clearly luminescent in the darkness. The luminescent shade will vary according to the nature of the sulphide or of the mixture of sulphides that is utilized.

Example 7

I start from 80-90 parts of a dry methylol derivative, for instance of dimethylol-urea prepared in a known manner and reduced into the state of powder. I incorporate therewith from 10 to 20 parts of a powder prepared in the dry state, containing an alkali-earth sulphide. I heat the mixture gradually up to a temperature of 130-140° C. for a period of time of 15-20 minutes. I reduce the product thus obtained into the state of a powder. I add thereto from 1 to 2 parts of benzoic acid, salicylic acid, sebacic acid, etc. I press it in a mould heated at a temperature between 130 and 140° C. It is possible to obtain in this manner excellent moulded articles. This body can be advantageously utilized as a plastifier to be incorporated with mouldable materials that are not sufficiently plastic.

Example 8

I maintain at ordinary temperature trioxymethylene mixed with from 20 to 25 parts of a powdered alkali-earth sulphide, such for instance as raw strontium sulphide prepared in the dry state. After adding useful acid agents and after a contact of several hours, the characteristic odour of thioaldehydes is already observable. The reaction can be very much accelerated by heating to a temperature of 90-100° C. By adding to this mixture a suitable amount of urea or thio-urea I obtain, after several hours of contact, a mass which is first compact, and is subsequently easy to divide into small parts and has the same plastic properties as the mixture prepared according to the preceding example. If the sulphide that is utilized has luminescent properties, these properties will be retained in the powder resulting from the reaction and also in the moulded articles obtained by means of said powder.

Example 9

I take 100 parts of the viscous alcoholic solution resulting from the condensation, in the hot state, in the presence of from 0.5 to 1 part of an acid, such as salicylic acid dissolved in ethyl alcohol, of 40 parts of dimethylol-urea. I incorporate therewith from 20 to 30 parts of the dry powder of a sulphide, such as zinc sulphide, calcium sulphide, or raw strontium sulphide prepared in the dry state.

I may replace, either wholly or partly, ethyl alcohol by other alcohols such as propyl, butyl, benzyl alcohol or mixtures of these alcohols. In some cases I will also advantageously add polyvalent alcohols such as ethylene glycol, ethers, oils such as castor oil, compounds such as tricresylphosphate and natural gums or resins, colophony, copal gum, etc. In the mixtures, left at ordinary temperature for several days, there is observed the formation of a substance that becomes less and less soluble and which has the appearance of a gum coating the portion of sulphide that is in excess.

If the mixture is utilized before the formation of this insoluble derivative, that is to say some hours after its preparation, it is possible to spread it on any suitable support, such as wood, glass, porcelain, metals, papers, fabrics, etc., on the surface of which it forms a varnish, after evaporation of the volatile solvents. When left for one or two hours in an oven, this varnish adheres strongly to its support and withstands in a perfect manner the usual stability tests of varnished surfaces. When the sulphides that are utilized have luminescent properties, it is possible, as already stated, to obtain, through the process above described, organic varnishes or enamels that are very resistant and luminous in darkness. This process also makes it possible to obtain thin luminescent films if the precaution is taken of avoiding adhesion of said film to its support, during evaporation and hardening, by interposing a fatty or other suitable material of suitable thickness in order to avoid adhesion.

The proportions that have been indicated in the preceding examples are not limitative. In a likewise manner the invention also includes the use of all polysulphides or sulphuretted compounds capable of liberating hydrogen sulphide under conditions analogous to those above described. Obviously it does not eliminate the utilization of free hydrogen sulphide (as mentioned in the U. S. Patent No. 2,004,996 above referred to), acting either directly or indirectly through temporary formation of a sulphuretted derivative easy to decompose according to one of the methods above described.

In the following claims, the expression "metal of the alkaline and alkaline-earth groups" is means to exclude ammonium which is sometimes classified with alkaline metals. Also the terms "urea" and "formaldehyde" as used in the claims are intended to include homologues and such derivatives as thiourea, and formalin, trioxymethylene and like sources of formaldehyde respectively.

What I claim is:

1. A method of preparing plastic materials derived from urea and formaldehyde and containing combined sulphur, which comprises passing through a urea-formaldehyde solution a current of carbon dioxide and simultaneously adding to the solution a sulphide of a metal of the alkaline and alkali-earth groups, in such manner as to maintain said solution in a substantially neutral state.

2. A method of preparing plastic materials derived from urea and formaldehyde and containing combined sulphur, which comprises passing through a urea-formaldehyde solution a current of carbon dioxide and simultaneously adding to said solution barium sulphide, in such a manner as to maintain said solution in a substantially neutral state.

3. A method of preparing plastic materials derived from urea and formaldehyde and containing combined sulphur, which comprises passing through a urea-formaldehyde solution a current of carbon dioxide and simultaneously adding to the solution calcium sulphide, in such manner as to maintain said solution in a substantially neutral state.

4. A method of preparing plastic materials derived from urea and formaldehyde and containing combined sulphur, which comprises passing through a urea formaldehyde solution a current of carbon dioxide and simultaneously adding to said solution strontium sulphide, in such manner as to maintain said solution in a substantially neutral state.

5. A method for the manufacture of plastic materials, which comprises bubbling carbon dioxide through a urea-formaldehyde solution, pouring slowly an amount of barium sulphide into said solution while still bubbling carbon dioxide, to produce hydrogen sulphide in statu nascendi and to precipitate barium as its carbonate, until the whole amount of barium sulphide has been converted to barium carbonate and removing the barium carbonate thus precipitated.

6. The method which comprises adding simultaneously to a urea-formaldehyde solution a sulphide of a metal selected from the group consisting of alkaline metals and alkali-earth metals, and an acid reagent capable of precipitating said metal as a salt from said sulphide while disengaging hydrogen sulphide from said metal sulphide thus causing hydrogen sulphide to react in statu nascendi with the urea-formaldehyde solution; and removing the salt thus precipitated.

RENÉ ARMENAULT.